(12) United States Patent
Fujita

(10) Patent No.: US 9,547,192 B2
(45) Date of Patent: Jan. 17, 2017

(54) DISPLAY DEVICE

(71) Applicant: NLT TECHNOLOGIES, LTD., Kawasaki, Kanagawa (JP)

(72) Inventor: Akira Fujita, Kanagawa (JP)

(73) Assignee: NLT TECHNOLOGIES, LTD., Kanagawa (JP)

( * ) Notice: Subject to any disclaimer, the term of this patent is extended or adjusted under 35 U.S.C. 154(b) by 340 days.

(21) Appl. No.: 14/479,413

(22) Filed: Sep. 8, 2014

(65) Prior Publication Data

US 2015/0070602 A1   Mar. 12, 2015

(30) Foreign Application Priority Data

Sep. 7, 2013  (JP) ................................. 2013-185784
Apr. 26, 2014  (JP) ................................. 2014-092159

(51) Int. Cl.
G02F 1/1333   (2006.01)

(52) U.S. Cl.
CPC . *G02F 1/13338* (2013.01); *G02F 2001/13332* (2013.01); *G02F 2202/28* (2013.01)

(58) Field of Classification Search
CPC .................................................. G02F 1/13338
USPC ...................................................... 349/12, 58
See application file for complete search history.

(56) References Cited

U.S. PATENT DOCUMENTS 7,324,174 B2 *  1/2008  Hafuka ............. G02F 1/133608
                                                   349/58

FOREIGN PATENT DOCUMENTS

JP         2012-128247         7/2012

* cited by examiner

*Primary Examiner* — Lucy Chien
(74) *Attorney, Agent, or Firm* — Young & Thompson

(57) ABSTRACT

A display device includes a front panel wholly bonded on a display part of a display module via OCR (a transparent optical elastomeric resin). If a dam for preventing the OCR from being infiltrated is overflowed, the OCR is inhibited from being infiltrated and diffused into an inside of the module. The display device includes a display module including upper and lower substrates, a case receiving the upper and lower substrates, and a bezel with an opened display part, mounted in the case part, and further including a front panel wholly bonded on a display part of the display module described above via a transparent optical elastomeric resin, and a resin dam disposed on a surface of the upper substrate along an open end of a reverse side of the bezel part, wherein at least a part of the resin dam is apart from the bezel part.

19 Claims, 26 Drawing Sheets

A-A' cross section

A-A' cross section

Dam form in abnormal state     In normal state

DISPLAY DEVICE

FIELD OF THE INVENTION

The present invention relates to a display device, particularly to a display device equipped with a front panel such as a touch panel and the like.

BACKGROUND ART

In recent years, display devices in which input interface parts such as a touch panel and the like are mounted and in which front panels such as toughened glass decorated and printed from the viewpoint of a design property and protection of a display surface are mounted are used increasingly for liquid crystal display modules as display devices.

When a front panel such as a touch panel and the like is mounted in a liquid crystal display module, an air layer is present usually between the surface of a liquid crystal panel and a touch panel in the module, and therefore light is reflected due to an optical property in an interface between the touch panel (for example, a glass substrate) and the air layer which are different in a refractive index.

A visibility of a displayed image is notably reduced due to interfacial reflection in the above part particularly under an environment of light coming from an outside. In order to decrease a reduction in the above visibility, proposed is a technology in which a transparent optical elastomeric resin having a refractive index close to that of a glass substrate of a touch panel is filled in or bonded on an air layer part, whereby interfacial reflection is inhibited to enhance a visibility of a displayed image.

The above wholly bonding technology is called optical bonding or direct bonding, and it has come to be widely used since it has not only optical effects but also mechanical effects such as preventing a front panel from scattering and enhancing an impact resistance.

FIG. 11 is a drawing showing a display module structure of a display device in conventional technologies. As shown in the drawing, a display module 801 composed from an LCD panel 802 as a display panel comprising upper and lower substrates bonded together, a backlight unit 803 as a case for receiving the upper and lower substrates described above, a bezel 804 which is opened in a display part and incorporated into the backlight unit 803, and the like.

Also, in a liquid crystal display device equipped with a touch panel, provided, as shown in FIG. 12, a front panel 806 which is wholly bonded (optical bonding) on a display part of the display module 801 via OCR (optical clear resin: a transparent optical elastomeric resin) 805.

Further, in wholly bonding the display module 801 and the front panel 806 via the OCR 805 of a UV curing type, a dam 807 for the purpose of sealing is usually formed by the same or similar OCR in an aperture part between the bezel 804 and the LCD panel 802 at a bezel end part in order to prevent the OCR 805 from being infiltrated into the module from the aperture part between the bezel 804 and the LCD panel 802 in the display module 801.

FIG. 13 is a drawing showing a process flow of optical bonding. A dam is temporarily cured, for example, by irradiating with a UV ray of a spot type so that a coating form is not broken, while carrying out dispense coating. Then, OCR for wholly bonding is coated thereon, and the front panel and the display module are bonded together, for example, under a decompression environment. Next, the OCR is temporarily cured, for example, by irradiating with a UV ray of a spot type, and then the OCR is cured by irradiating the wholly with a prescribed dose of a UV ray by means of, for example, a conveyor UV device, whereby the OCR is cured, and the front panel and the display module are adhered.

On the other hand, the bezel part of the display module is undulated due to tolerance in forming the members and assembling them, and the bezel part and the resin dam which are to be originally adhered are separated, so that in certain cases, the dam for the purpose of sealing can not regularly be formed or is broken due to external stress exerted in bonding.

The dam described above is formed usually by coating a prescribed amount of the dam material at a fixed rate by means of a dispenser and the like, and due to tolerance in an aperture between the bezel part and the upper and lower substrates, the dam material flows and is infiltrated (this phenomenon is called sink) into a reverse side of the bezel in a large part of the aperture before temporarily curing the dam material by irradiation with a UV ray. Accordingly, the dam can not normally be formed, and an aperture is liable to be formed between the resin dam and the bezel.

If the aperture is present between the dam and the bezel in bonding, the OCR is infiltrated through the aperture into an inside of the display module. The resin infiltrated into an inside of the module is not cured even after time passes because it is not irradiated with a UV ray, and it spreads to all parts of the aperture. In the worst case, it spreads to a reverse side of the panel and an illuminated face of the backlight to cause inferior display in a certain case, and the defect that the uncured OCR leaks out from the display module is brought out in a certain case.

Alternatively, even when the bezel and the resin dam are adhered and fixed by forming normally the dam, the panel and the bezel move temporarily upward and downward respectively in a bonding step, a transporting step and the like in a certain case, which results in that adhesion between the bezel and resin dam is broken and that an infiltration route into the inside of the module is formed even if temporarily.

A method for meeting the problem of controlling protrusion (infiltration) of the OCR by forming plural dams is disclosed in Patent Literature 1 (FIG. 15).

In the above method, a display face Da adsorbed and held on a liquid crystal panel D1 in an optical display device is turned downward and faced oppositely to a bonding face Pa of a transparent tabular member P at some gap, and a first loading base 1 is moved downward to apply a pressing force onto a liquid optical resin R (OCR) with a second loading base 6.

As shown in FIG. 15, a second dam K2 is provided at an outside of a first dam K1 corresponding to a usual dam on the transparent tabular member P, and the OCR overflowing over the first dam K1 by bonding the panel D1 and the member P is blocked by the second dam K2.

Also, it is indicated that the OCR can be inhibited from overflowing by curing wholly the OCR when the overflowing OCR reaches the vicinity of the peak of the second dam K2.

PRIOR ART LITERATURE

Patent Literature

Patent Literature 1: Japanese Laid-open Patent Publication No. 2012-128247

SUMMARY OF THE INVENTION

Problems to be Solved by the Invention

In the subject of the Patent Literature 1 which is the conventional technology described above, it is firstly a premise in the above technology that the OCR overflowing the dam can be cured as well by irradiation with a UV ray, and a case of bonding in which at least one of them is a transparent substrate is supposed. That is, it can not be a countermeasure for leakage of the uncured OCR in a light shielding part irradiated with no UV ray, which is targeted by the present invention.

Also, secondly, the subject described above can be met by using a thermosetting resin, but the resin has to be cured before it overflows the second dam beyond the first dam. The overflowing manner is not necessarily even in the whole periphery depending on various tolerance of the bonding members. Further, even the thermosetting resin is spread into various gaps prior to curing in the module due to a reduction in a viscosity thereof in heating.

That is, the problem that time spent in bonding up to curing has to be managed for controlling protrusion of the resin is involved therein, and a freedom of the production is damaged to a large extent. Also, in bonding the module with the front panel having a printing part (light shielding part), protrusion of the resin is required to be controlled in a region in which overflowing of the resin is not observed, and therefore it is very difficult to actualize such controlling.

Accordingly, an object of the present invention is to solve the above problems of the conventional technologies. To be specific, the object is to prevent inferior display and inferior appearance due to infiltration of the uncured OCR into the module in a display device comprising a front panel wholly bonded via the OCR.

Means for Solving the Problem

In order to solve the problems described above, the present invention is characterized by a display device comprising a display module comprising upper and lower substrates bonded together, a case part for receiving the upper and lower substrates described above, and a bezel part which has an opened display part and which is mounted in the case part, and further comprising a front panel wholly bonded on a display part of the display module described above via a transparent optical elastomeric resin, and a resin dam disposed on a surface of the upper substrate along an open end of a reverse side of the bezel part, wherein at least a part of the resin dam is apart from the bezel part, and a resin flow-inhibiting member having a resin absorbing property which is disposed apart from the resin dam is provided in at least a part of a space part between the reverse side of the bezel part and the surface of the upper substrate.

Also, the present invention is characterized by a display device comprising a display module comprising upper and lower substrates bonded together, a case part for receiving the upper and lower substrates described above, and a bezel part which has an opened display part and which is mounted in the case part, and further comprising a front panel wholly bonded on a display part of the display module described above via a transparent optical elastomeric resin, and a resin dam disposed on a surface of the upper substrate along an open end of a reverse side of the bezel part, wherein at least a part of the resin dam is apart from the bezel part, and a resin flow-inhibiting member having no resin absorbing property which is disposed in contact with the resin dam is provided in at least a part of a space part between the reverse side of the bezel part and the surface of the upper substrate.

Further, the resin flow-inhibiting member described above is adhered and fixed to any one of the reverse side of the bezel part and the surface of the upper substrate and is not adhered and fixed to the other thereof, and an aperture may be present between them.

Also, the resin flow-inhibiting members are adhered and fixed independently to both of the reverse side of the bezel part and the surface of the upper substrate respectively, and an aperture may be present between the opposite resin flow-inhibiting members described above.

In addition thereto, the resin flow-inhibiting member may have an approximately flat, waved or irregular form on a surface thereof which is opposite to the aperture.

Also, the resin flow-inhibiting member may have an approximately rectangular or wedge form in a cross section thereof which is orthogonal to a display face of the display part.

Alternatively, the present invention is characterized by a display device comprising a display module comprising upper and lower substrates bonded together, a case part for receiving the upper and lower substrates described above, and a bezel part which has an opened display part and which is mounted in the case part, and further comprising a front panel wholly bonded on a display part of the display module described above via a transparent optical elastomeric resin, and a resin dam disposed on a surface of the upper substrate along an open end of a reverse side of the bezel part, wherein the resin dam is brought into contact with the bezel part; a resin flow-inhibiting member is provided in at least a part of a space part between the reverse side of the bezel part and the surface of the upper substrate; and the transparent optical elastomeric resin is present in at least a part of the space part between the reverse side of the bezel part and the surface of the upper substrate.

Also, in a region in which the resin dam is brought into contact with the bezel part, the resin flow-inhibiting member having no OCR absorbing property is preferred, and it is preferably arranged so that it is brought into contact with the resin dam. In this case, the resin flow-inhibiting member can inhibit sink marks in forming the dam to reduce inferior formation itself of the resin dam.

Alternatively, the resin flow-inhibiting member may have an OCR absorbing property. In this case, the resin flow-inhibiting member is arranged apart from the resin dam.

Effects of the Invention

As described above, in the display device according to the present invention, at least a part of the resin dam provided on the surface of the upper substrate along the vicinity of the open end of the bezel part is apart from the bezel part, and the resin flow-inhibiting member is disposed in at least a part of the aperture part between the reverse side of the bezel part and the surface of the upper substrate, whereby the overflowed OCR is absorbed by the resin flow-inhibiting member itself and can be inhibited from being diffused furthermore into an inside of the display module even if the dam part is broken after forming it to cause the OCR to be infiltrated into the module, because the resin flow-inhibiting member is disposed in an infiltration route.

Also, in a region in which the resin dam is apart from the bezel part, the resin flow-inhibiting member is provided with an OCR absorbing property and arranged so that it is not brought into contact with the resin dam, whereby the concern that the resin flow-inhibiting member absorbs the resin for forming the dam in forming the dam is removed.

Accordingly, time is not required to be managed for the purpose of controlling infiltration of the OCR in the production, which results in making it possible to prevent inferior display and inferior appearance (leaking OCR) from being brought about without damaging a freedom of the production.

On the other hand, the resin flow-inhibiting member does not necessarily have an OCR absorbing property. In this case, the resin flow-inhibiting member is brought into contact with the resin dam to assume a state in which an inside of the module is isolated from an outside thereof, whereby the OCR can be prevented from being infiltrated into the inside of the module even if the dam part is overflowed to cause the OCR to be infiltrated into the module, because the inside of the module is isolated from the outside thereof.

In this regard, when the upper and lower substrates and the bezel part are adhered and fixed by a sealing member and the like, a high elasticity of the high sealing member and a size of the sealing gap cause uneven display. In particular, uneven display is liable to be brought about due to an external stress in the case of a TFT-LCD panel of an in-plane switching system, and when the sealing member is filled in an aperture part between the reverse side of the bezel and the surface of the upper and lower substrates to adhere and fix them, a pressing load is applied on the LCD panel, and uneven display is readily brought about.

In the present invention, the resin flow-inhibiting member is not adhered with and fixed to at least the bezel part or any one of the upper and lower substrates, or if adhered and fixed, an aperture left without adhering and fixing completely the aperture part is present, and therefore the uneven display described above can be prevented. Further, if defects are produced on the display module, they can readily be repaired, and a rise in the yield and the loss of the cost can be reduced.

That is, since it is a premise in the present invention that the bezel part and the upper and lower substrates do not dare to be adhered and fixed and that an aperture of a fixed extent is provided, the upper and lower substrates described above are less susceptible to a stress even if influences such as tolerance in the assembly tolerance are exerted, and this is not regulated by an elastic modulus and the quality of the resin flow-inhibiting member.

In the above case, the resin flow-inhibiting member is preferably formed by a material having an OCR absorbing property. Even if infiltration of the OCR is brought about, an aperture is provided, as described above, at a part in which the resin flow-inhibiting member is arranged, whereby a contact area thereof with the OCR is increased, and therefore the OCR can efficiently be inhibited for a short time from being diffused. As described above, the structure of the present invention in which the aperture is provided is assumed, whereby an optimum countermeasure for leaking (countermeasure for diffusion) for the OCR according to the purposes can be carried out without applying a stress to the upper and lower substrates.

On the other hand, even when the bezel and the resin dam are adhered and fixed by forming the normal dam, the panel and the bezel move temporarily upward and downward respectively in a bonding step, a transporting step and the like in a certain case, which results in that adhesion between the bezel and resin dam is broken and that an infiltration route into the inside of the module is formed even if temporarily. Even in the above case, the overflowed OCR is absorbed by the resin flow-inhibiting member itself to make it possible to prevent the OCR from being infiltrated into an inside of the module, because the resin flow-inhibiting member having an OCR absorbing property is disposed in the infiltration route.

MODES FOR CARRYING OUT THE INVENTION

The embodiment of the display device according to the present invention shall be explained below based on the drawings. In the present embodiment, a liquid crystal display device is explained as the display device, but the present invention shall not be restricted to it, and it may be a plasma display, an organic EL display, an electronic paper display and the like.

Further, the OCR for wholly bonding shall be explained in the case of the OCR of a UV curing type, but the same effects can be obtained as well in the case of the OCR of a thermosetting type, a humidity curing type or a combined curing type thereof, and therefore the OCR shall not be restricted to the UV curing type.

EXAMPLES

Example 1

Figure 1:
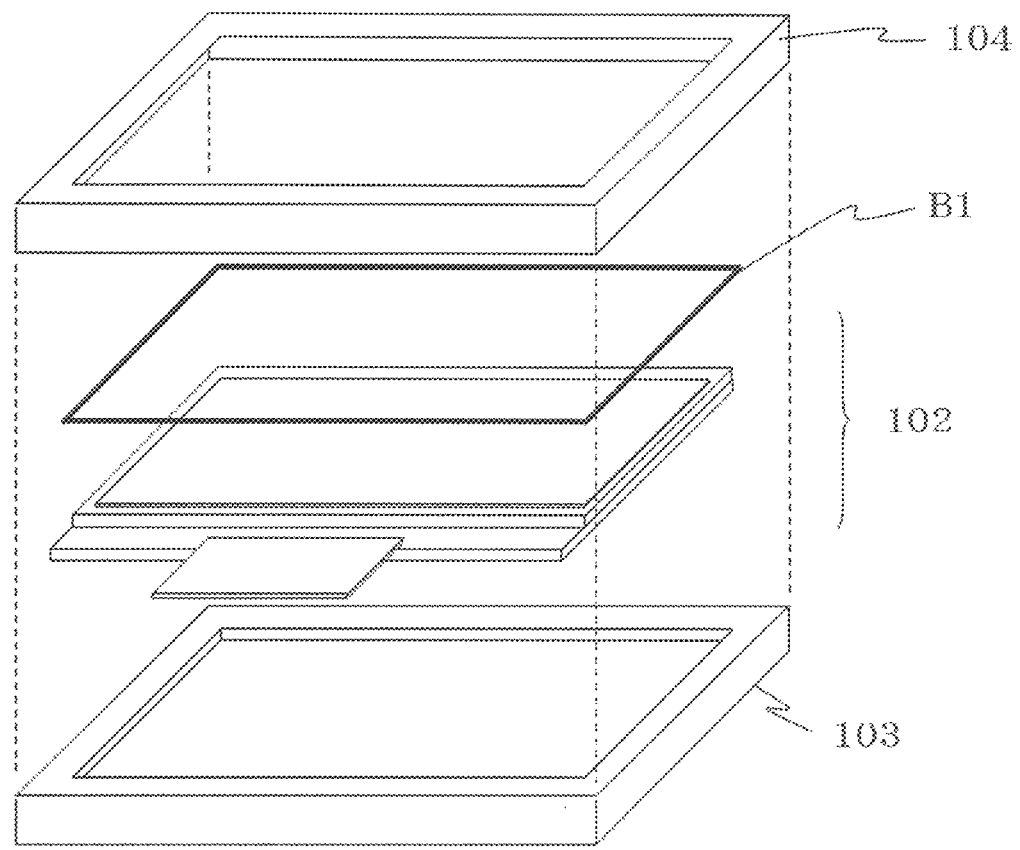
FIG. 1 is a drawing showing the structure of the display module in Example 1 according to the present invention.

The constitution of a liquid crystal display device in a first embodiment (Example 1) is shown in FIG. 1 to FIG. 4. FIG. 1 is a drawing showing the structure of the display module in the present embodiment.

A display module 101 according to the present embodiment comprises an LCD panel 102 as a display panel comprising upper and lower substrates (a CF substrate (a color filter substrate) and a TFT substrate) bonded together, a backlight unit 103 as a case part for receiving the upper and lower substrates described above, and a bezel part 104 which has an opened display surface D and which is mounted in the backlight unit 103, wherein a resin flow-inhibiting member B1 is arranged between the LCD panel 102 and the bezel part 104 over a whole periphery thereof.

Figure 2:
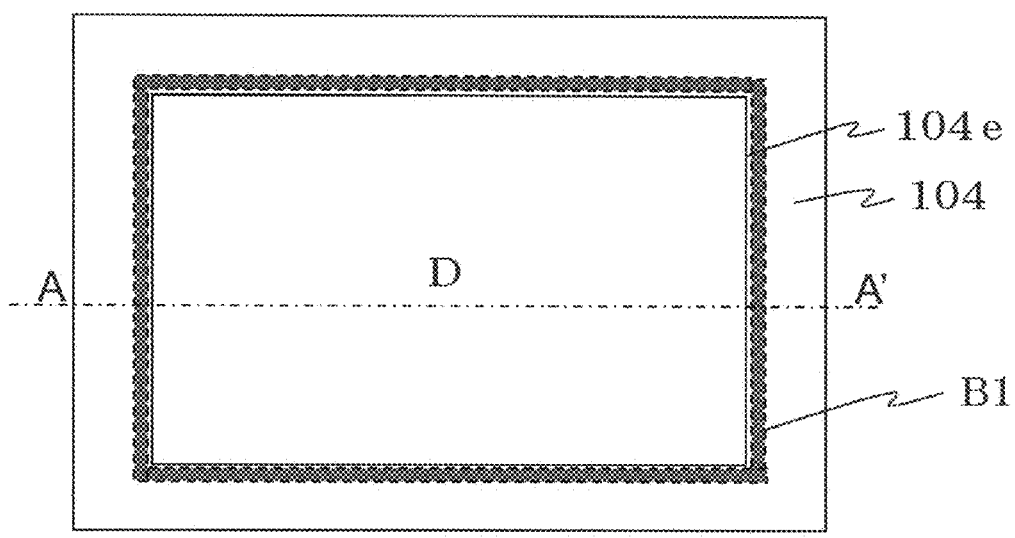
FIG. 2 is a cross section of the structure of the display module in Example 1 according to the present invention.
Figure 2:
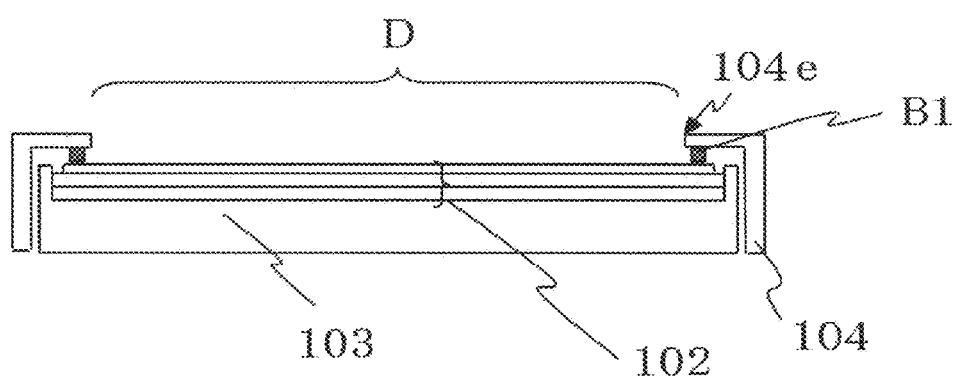

FIG. 2 is an approximate upper surface drawing of the display module 101 shown in FIG. 1, and an A-A' cross section. The resin flow-inhibiting member B1 has an aperture in a space with the surface of the LCD panel 102, and it is disposed along the vicinity of an open end 104e of a rear side of the bezel 104 via an adhesive.

A cross-sectional dimension of the aperture between the LCD panel 102 and the bezel 104 is varied according to the kind of the display module 101 and the waving manner of the bezel 104, and it is almost 0.05 mm to 1 mm. In the present example, it is designed at 0.3 mm. Also, a cross-sectional dimension of the resin flow-inhibiting member B1 is set to a thickness of 0.2 mm and a width of 1.5 mm which are smaller than the dimension of the aperture described above, taking an assembly tolerance thereof into consideration.

On the other hand, the arranged position of the resin flow-inhibiting member B1 is preferably as close to the open end 104e of the bezel part 104 as possible. However, if the member B1 is too close to the dam in forming a dam described later, it rather absorbs the dam material staying in an uncured state and results in forming the inferior dam, and therefore the resin dam and the resin flow-inhibiting member B1 are arranged in a position in which they are not brought into contact with each other.

The resin flow-inhibiting member B1 may be of a material having a high absorbing property, for example, a block member comprising a steric network structure, such as urethane sponges and PVA sponge materials and the like, and non-woven fabrics having a water absorbing property such as Bemcot (manufactured by Asahi Kasei Fiber Corporation), and oil blotting films absorbing sebum can be applied as well.

Further, in respect to an elastic modulus thereof, the material having a low elasticity is preferred as a measurement for irregular display caused by a risk of contact with the LCD panel 102 in a case in which the aperture between the bezel 104 and the LCD panel 102 is designed so that it is narrow and in which it has tolerance to a large extent. However, the material having a high elasticity can be applied as well when a fixed aperture can be maintained between the bezel 104 and the LCD panel 102, considering assembly tolerance. The material and the form thereof can freely be selected according to the production process and the OCR used putting a priority on any of the characteristics 1.

Figure 12:
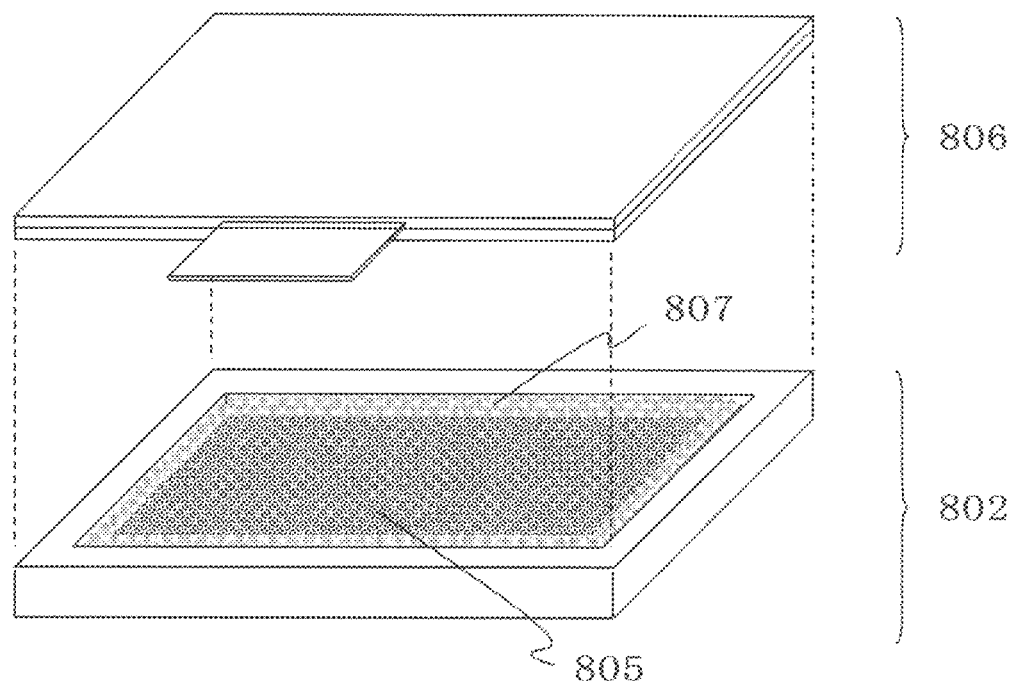
FIG. 12 is a drawing showing a liquid crystal display device equipped with a touch panel.
Figure 13:
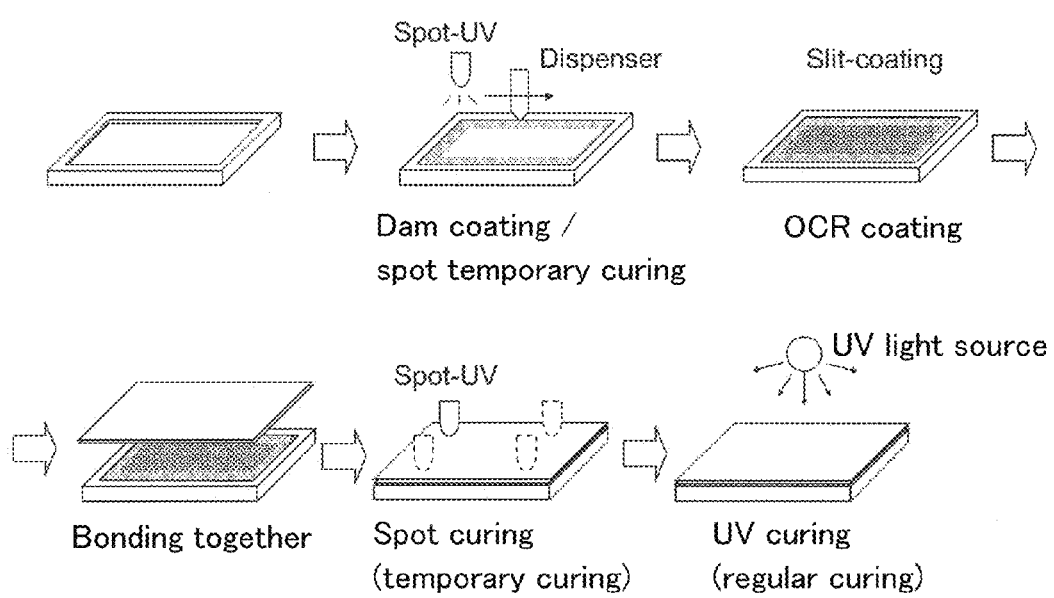
FIG. 13 is a flow diagram of an optical bonding process.

The display device in which the front panel (touch panel) is bonded wholly on the display module is the same as the display device of the conventional technology shown in FIG. 12. Also, the optical bonding technology shown in FIG. 13 can be used for the wholly bonding method.

Figure 3:
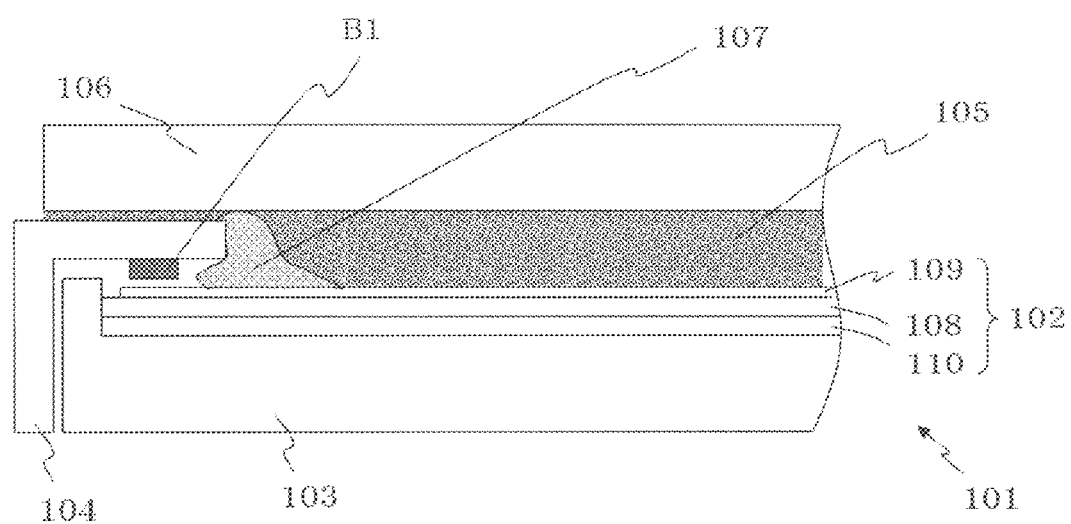
FIG. 3 is a drawing showing the detailed cross section of the structure of the display module in the normal state of the dam in Example 1 according to the present invention.

FIG. 3 is a drawing showing the cross-sectional structure of the display device in which the OCR is wholly coated on the display module shown in FIG. 2 by the optical bonding technology. The LCD panel 102 is composed at least of the TFT substrate 110 brought into contact with the backlight unit 103, the CF substrate 108 faced thereto via a liquid crystal, and a polarizing plate 109 brought into contact with the OCR 105.

Also, the front panel 106 as the touch panel wholly bonded via the OCR 105 is provided, as shown in FIG. 3, on the display surface D of the display module 101.

Further, a dam 107 for preventing the OCR 105 from being infiltrated into the display module is provided in an aperture part between the bezel 104 and the LCD panel 102. The dam 107 is formed along the open end 104e of the bezel part 104 by the optical bonding technology shown in FIG. 13 using an OCR which is the same as or similar to the OCR 105.

When the dam 107 is formed well, an inside of the display module 101 is isolated from an outside thereof by the dam itself, and therefore the OCR 105 is prevented from being infiltrated into the display module even when the OCR is wholly coated. However, in a case where a coating amount of the resin in forming the dam is too much and a case where the aperture in forming the dam is broad, a part of the dam material is infiltrated into the rear side of the bezel 104 before cured with a UV ray, and the same defect as a case where the OCR is infiltrated is brought about.

In contrast with this, the resin flow-inhibiting member B1 is arranged in the vicinity of the open end 104e on the rear side of the bezel part 104 in the present example, and therefore the surplus dam material infiltrated is absorbed by the resin flow-inhibiting member B1 described above to make it possible to inhibit the dam material itself from being dispersed into the module. The OCR is coated according to the flow shown in FIG. 13 and superposed (OCR wholly bonding) thereon. In the above case, the OCR is overflowed on the bezel beyond the resin dam in a certain case, but the OCR is irradiated with a UV ray in the present curing step, and therefore the overflowed OCR as well as the OCR staying on the display surface does not remain in an uncured state. Thus, the display module which does not have a risk of inferior display caused by the uncured OCR and on which the front panel is wholly bonded by the OCR is completed.

Figure 14:
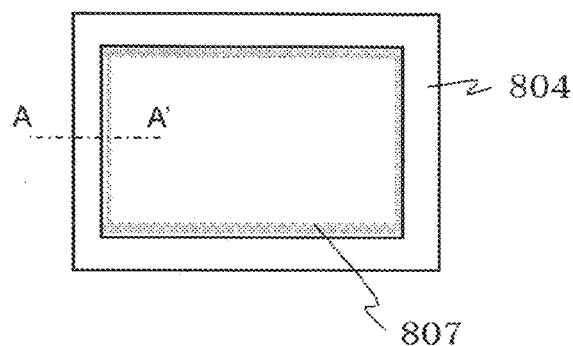
FIG. 14 is a drawing showing an abnormal state and a normal state of a bonding dam form.
Figure 14:
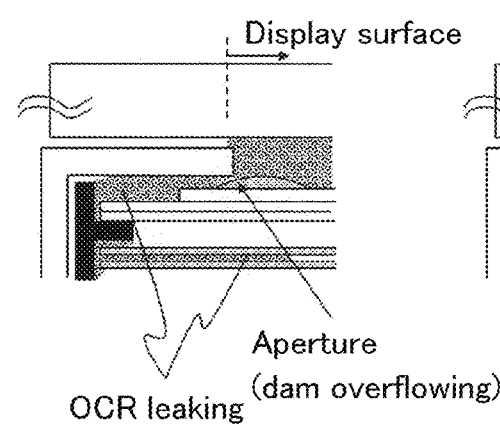
Figure 14:
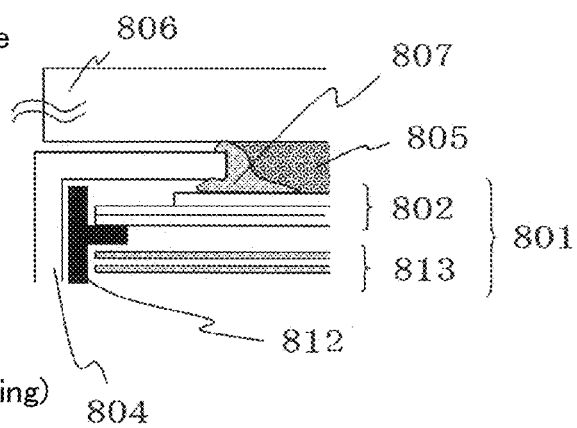
Figure 15:
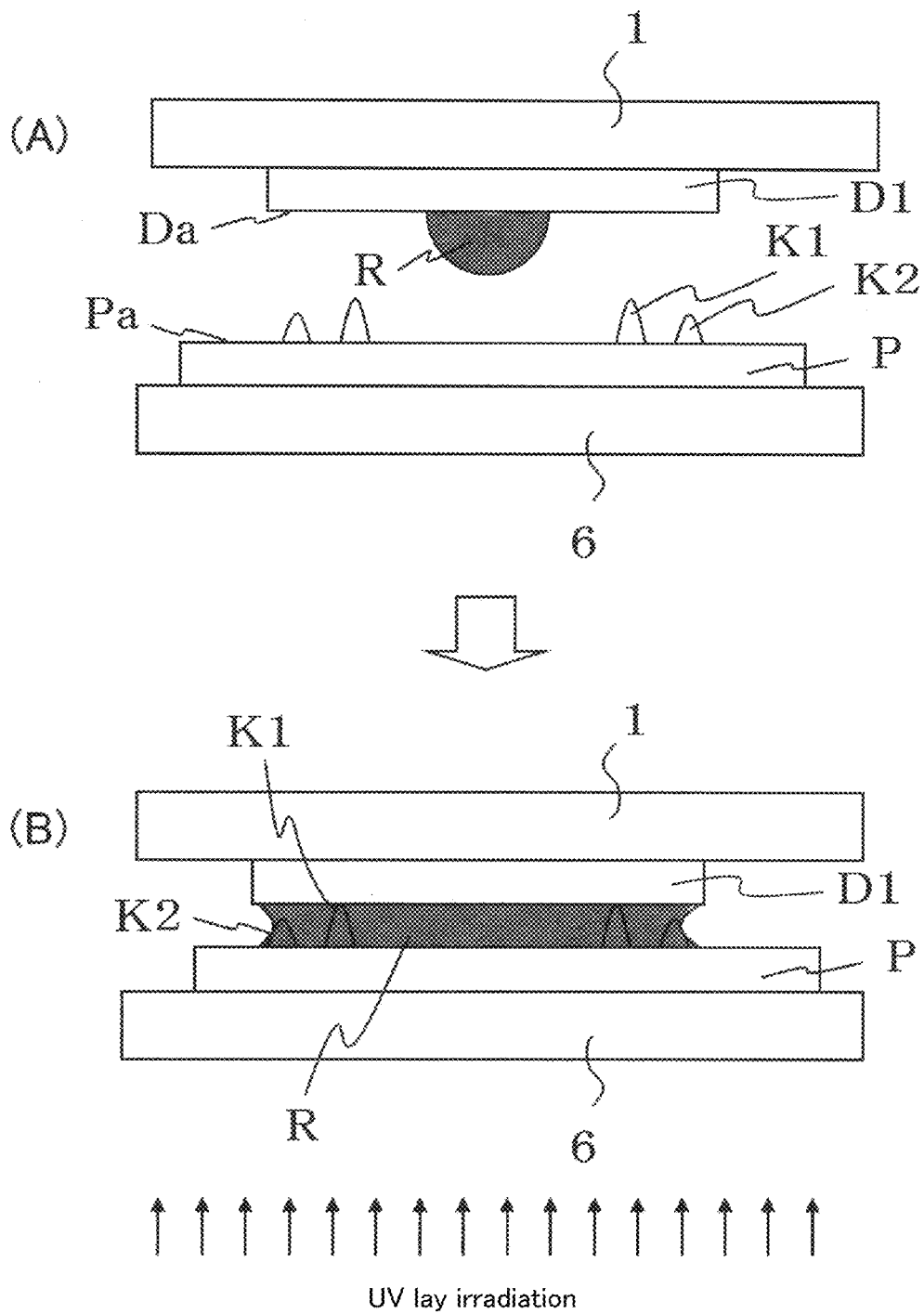
FIG. 15 is a drawing showing a production process of the display module in the conventional technology described in Patent Literature 1.

FIG. 14 is a drawing showing an A-A' cross section of the display module in a case where the dam stays generally in a normal state and an abnormal state. As can be understood from this drawing, a dam 807 is formed so that it runs onto a tip part of a bezel 804 in a normal state, and an OCR 805 can be prevented from being leaked. However, if an aperture is present between the dam and the bezel in bonding, the OCR is infiltrated from the aperture into the inside of the display module such as a backlight chassis 812 and an optical sheet 813.

Figure 4:
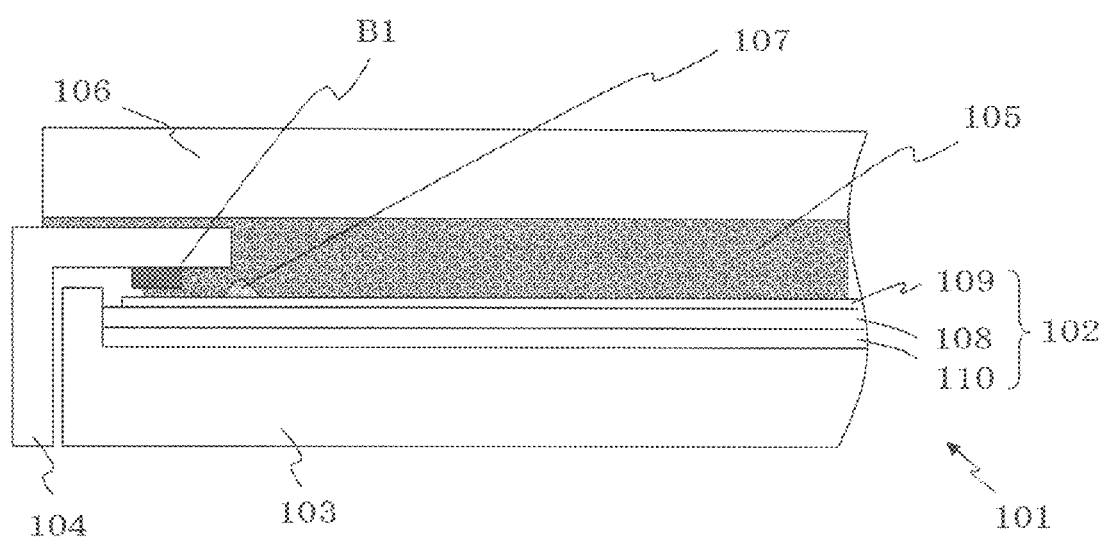
FIG. 4 is a drawing showing the detailed cross section of the structure of the display module in the breaking state of the dam in Example 1 according to the present invention.

FIG. 4 is a cross section in a case where the dam shown in FIG. 3 is, as is the case with an abnormal state of the form of the dam shown in FIG. 14, not formed normally and is overflowed. That is, if the resin dam is formed in a wrong state due to factors such as the bezel, assembly tolerance and the like to cause an aperture to be present between the bezel 104 and the surface of the LCD panel 102, the OCR 105 is infiltrated from the aperture between the bezel and the surface of the LCD panel into the inside of the display module in optical bonding, but the OCR infiltrated is absorbed by the resin flow-inhibiting member B1 arranged in an infiltration route.

In particular, the aperture is provided between the resin flow-inhibiting member B1 and the LCD panel 102, whereby a contact area of the member B1 with the OCR infiltrated is increased, and therefore the member B1 can absorb the OCR efficiently and quickly to make it possible to inhibit the OCR from being dispersed furthermore into the inside of the module.

The resin flow-inhibiting member B1 absorbs the OCR infiltrated and introduces it into an inside thereof, and therefore the OCR can be inhibited from being dispersed into the inside of the module, which results in making it possible to prevent inferior display and inferior appearance (leaking of the OCR).

Further, the resin flow-inhibiting member B1 is arranged in an aperture between the LCD panel 102 and the bezel 104, and it has a fixed aperture in a cross-sectional direction and therefore does not apply a stress on the LCD panel 102 to make it possible to prevent irregular display from being brought about.

Example 2

Next, a second embodiment (Example 2) shall be explained. In the drawings, items common to the first embodiment shall be omitted or shown by the same last two figures of the symbols (hereinafter the same shall apply to the other examples).

Figure 5:
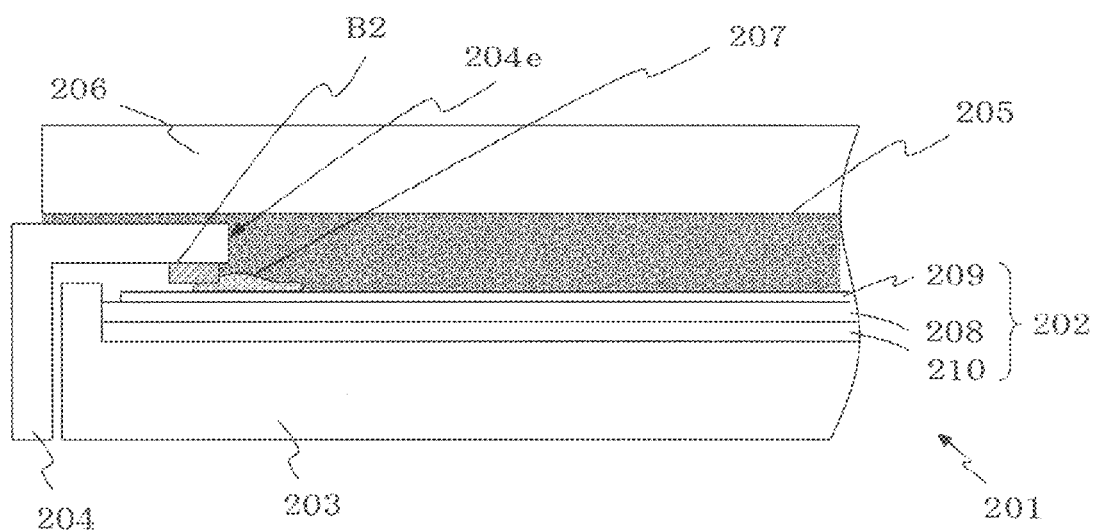
FIG. 5 is a drawing showing the detailed cross section of the structure of the display module in the breaking state of the dam in Example 2 according to the present invention.

In the second embodiment, a resin flow-inhibiting member B2 having no OCR absorbing property is arranged unlike the first embodiment (FIG. 5). The resin flow-inhibiting member B2 is arranged in the vicinity of an open end 204e of a rear side of a bezel 204 to thereby make it possible to inhibit a resin dam 207 from causing sink marks in forming it and to reduce inferior formation itself of the resin dam 207.

Even when the resin dam 207 described above is not formed normally, the resin dam 207 and the resin flow-inhibiting member B2 have to be arranged in a position sufficiently close to each other so that they are brought into contact. In the case of the present example, the resin flow-inhibiting member B2 is brought into contact with the resin dam 207, and therefore an inside of the module 201 is isolated from an outside thereof to make it possible to inhibit the OCR from being dispersed into an inside of the module even when the OCR is leaked.

Example 3

Figure 6:
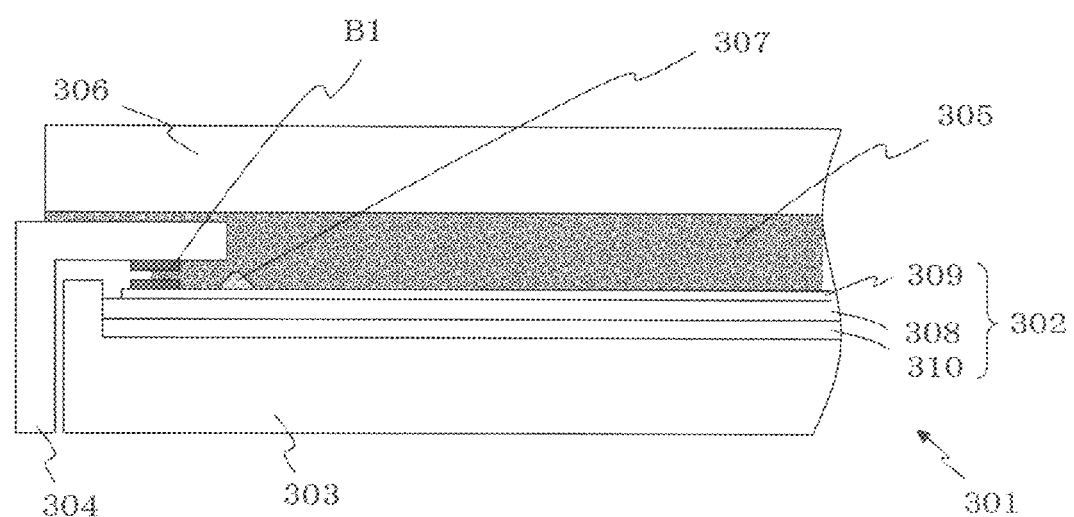
FIG. 6 is a drawing showing the detailed cross section of the structure of the display module in the breaking state of the dam in Example 3 according to the present invention.

In Example 3 of the present invention, the resin flow-inhibiting member B1 having an OCR absorbing property is arranged, as shown in FIG. 6, on both of a rear side of a bezel 304 and a surface of an LCD panel 302, and an aperture is provided between the above resin flow-inhibiting members. In the case of the present example, a larger contact area of an OCR 305 leaked with the resin flow-inhibiting member B1 can be secured, and therefore the OCR leaked can be prevented more surely and more quickly from being dispersed.

Example 4

Figure 7:
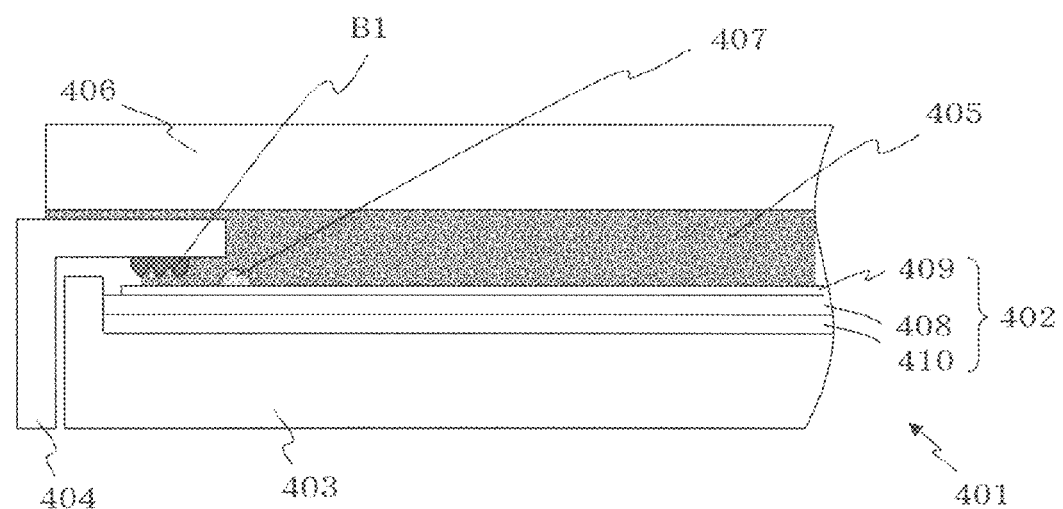
FIG. 7 is a drawing showing the detailed cross section of the structure of the display module in the breaking state of the dam in Example 4 according to the present invention.

In Example 4, irregularities may be provided, as shown in FIG. 7, on the surface of the resin flow-inhibiting member B1 having an OCR absorbing property used in Example 1. Also in the present example, a contact area of the member B1 with an OCR 405 can be expanded as is the case with Example 3, and the same effects can be obtained.

Example 5

Figure 8:
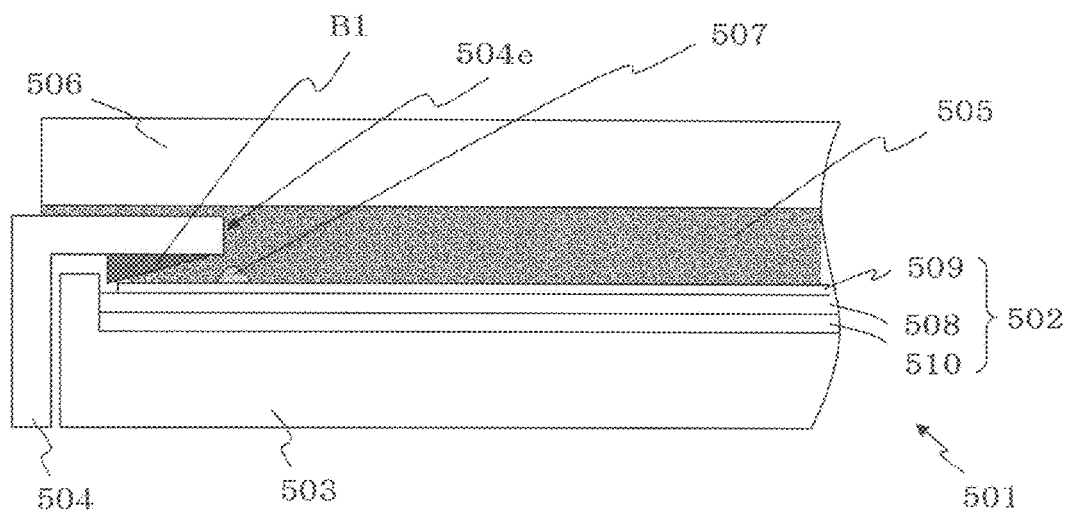
FIG. 8 is a drawing showing the detailed cross section of the structure of the display module in the breaking state of the dam in Example 5 according to the present invention.

In Example 5, the resin flow-inhibiting member B1 having an OCR absorbing property may be constituted, as shown in FIG. 8, so that a cross section thereof assumes a wedge shape from an open end 504e of a rear side of a bezel 504 to a direction of an external end of the display panel. Also in the constitution of the present example, an expanding effect of a contact area of the member B1 with f an OCR 405 is obtained as is the case with Examples 3 and 4.

Particularly in the present example, the member B1 is constituted so that it is brought into contact with an LCD panel at an end part thereof, whereby an aperture space under the bezel stays in such a state that it is almost isolated from an inside of the display module, and on the other hand, a stress exerted on the LCD panel can be reduced. Accordingly, the member B1 is constituted so that the OCR can be inhibited to the maximum from being diffused while inhibiting uneven display.

Example 6

Figure 9:
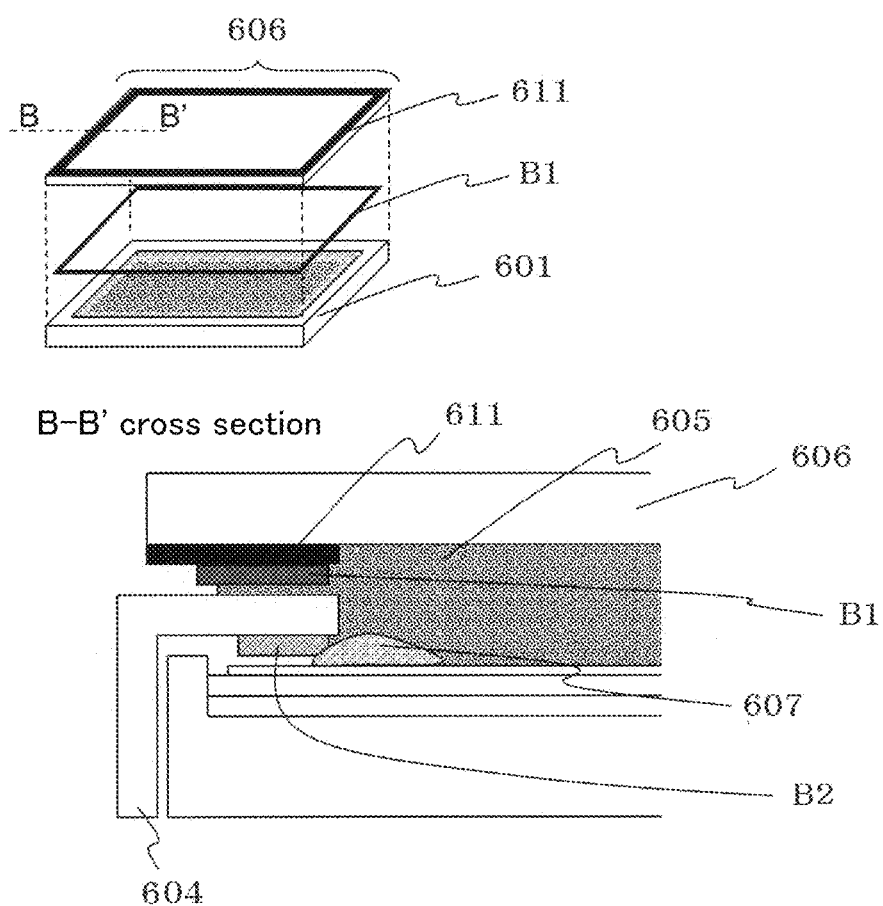
FIG. 9 is a drawing showing the detailed cross section of the structure of the display module in Example 6 according to the present invention.

In Example 6, assumed is, as shown in a structural drawing (a) of a display module and a B-B' cross-sectional drawing (b) in FIG. 9, a constitution in which a front panel 606 provided with a decoration print is bonded wholly on the display module 601 used in Example 2. The display module itself is endowed, as is the case with the constitution in Example 2, on a rear side of a bezel 604 with the resin flow-inhibiting member B2 having no OCR absorbing property.

Decoration printed by a black color is provided in a peripheral part of the front panel 606 bonded on the display module 601, and assumed is a constitution in which the resin flow-inhibiting member B1 having an OCR absorbing property is arranged on all periphery of a decoration print part 611.

In this regard, in bonding the front panel provided with a decoration print, the OCR infiltrated under the decoration print part 611 is not cured since a UV ray is blocked off. Accordingly, it is cured usually by irradiating with a UV ray from a side direction (an external end direction of the module), and if a printed width is long, it is not cured in a certain region due to no irradiation with a UV ray.

A part cured by irradiation from the side direction with a UV ray has the same effect as that of a dam formed in an inside of the display module, but in a case where curing is inferior and a case where defects such as peeling and the like are brought about due to an external stress, the uncured OCR under the decoration print part leaks out. In order to prevent the above matter in the present example, the resin flow-inhibiting member B1 having a high OCR absorbing property is arranged on the decoration print part, whereby a leaking risk of the uncured OCR can be reduced.

Example 7

Figure 10:
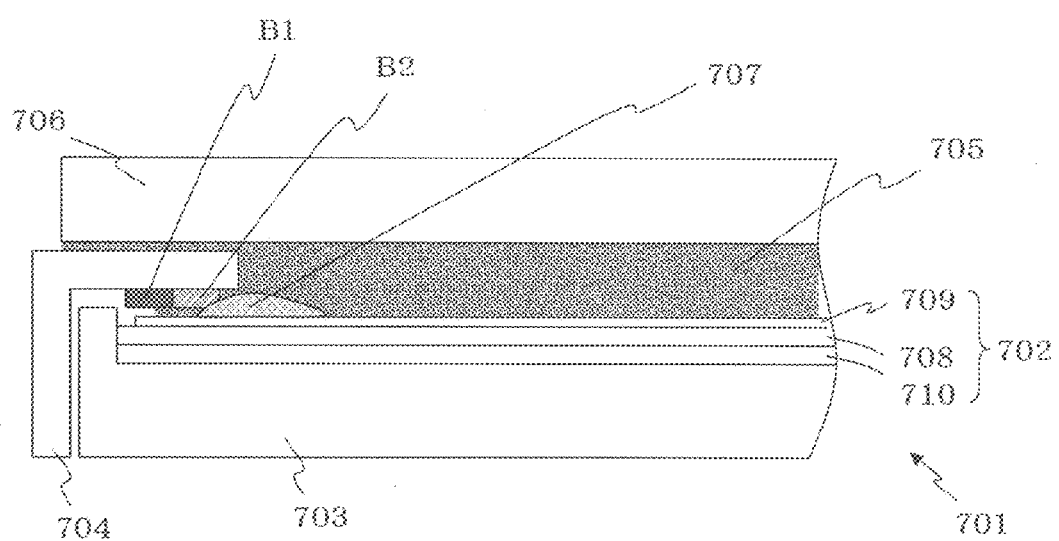
FIG. 10 is a drawing showing the detailed cross section of the structure of the display module in Example 7 according to the present invention.
Figure 11:
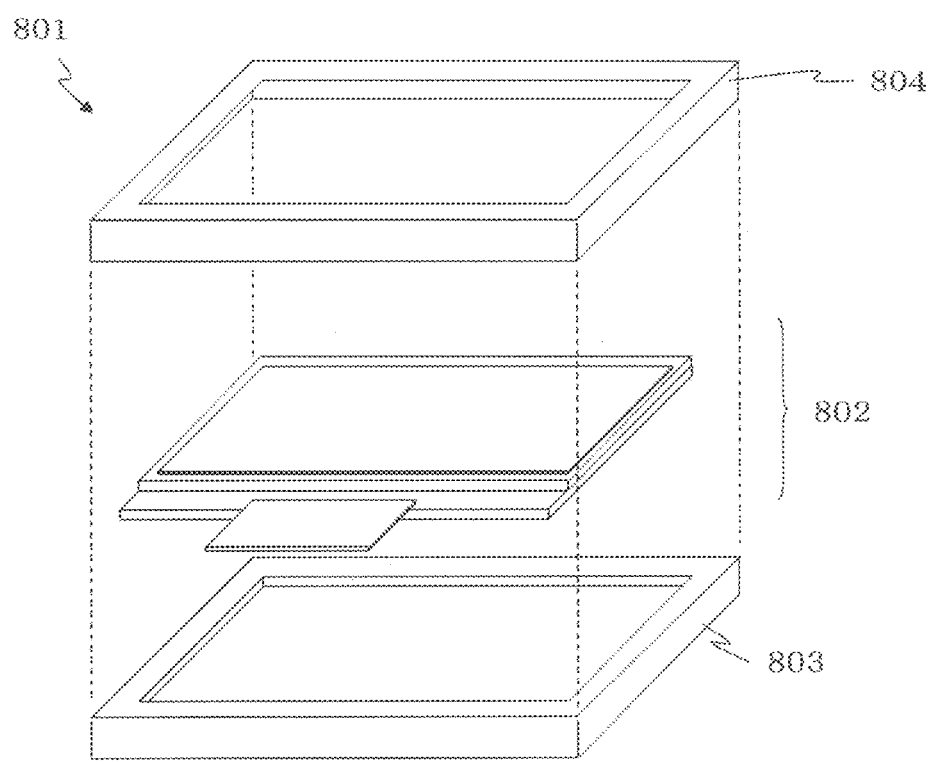
FIG. 11 is a drawing showing the structure of the display module in the conventional technology.

In Example 7, assumed is, as shown in FIG. 10, a constitution in which the resin flow-inhibiting member B1 (having an absorbing property) of the display module used in Example 1 and the resin flow-inhibiting member B2 (having no absorbing property) used in Example 2 are arranged side by side.

When the constitution shown in Example 2 is assumed, the panel and the bezel move upward and downward respectively due to transportation and the like in or after bonding depending on the structure of the module, and the dam is overflowed temporarily in a certain case. In particular, the above matter is liable to be brought out in a case where the adhesive forces of the resin dam and the resin flow-inhibiting member are unsatisfactory and a case where looseness and play are caused in assembling the module.

In the above case, the constitution of the present example is assumed, whereby sink marks caused on the resin dam in forming it are inhibited by the resin flow-inhibiting member B2, and the OCR is absorbed by the resin flow-inhibiting member B1 adjacent thereto when the dam is overflowed to cause the OCR to be infiltrated, so that the OCR can be inhibited from being diffused into an inside of the module.

Examples 1 to 7 have so far been explained, and an embodiment in which the materials and the physical properties of the resin flow-inhibiting member are changed or an embodiment in which they are combined may be assumed. For example, the resin flow-inhibiting member having no absorbing property can be used in Examples 3 to 5 to assume the constitution as is the case with Example 2.

Also, when spots in which OCR is liable to leak, such as the vicinities of the four corners in the open end of the bezel, spots in which contact pieces for electrostatic countermeasure are arranged on a rear side of the bezel, and the like are identified, though not illustrated, in advance as spots in which an aperture between a rear side of the bezel and the panel is large and in which the dam is liable to be overflowed, the resin flow-inhibiting member can be arranged only in the corresponding spots instead of the whole periphery.

Further, the dam resin may be color resins, films, tapes and the like without limiting to resins which are the same as or similar to the OCR and the optical elastomeric resin.

As explained in Example 7, even when the bezel and the resin dam are adhered and fixed by forming the normal dam, the panel and the bezel move temporarily upward and downward respectively in a bonding step, a transporting step and the like in a certain case, which results in that adhesion between the bezel and resin dam is broken and that an infiltration route into the inside of the module is formed even if temporarily.

Example 8

Figure 16A:
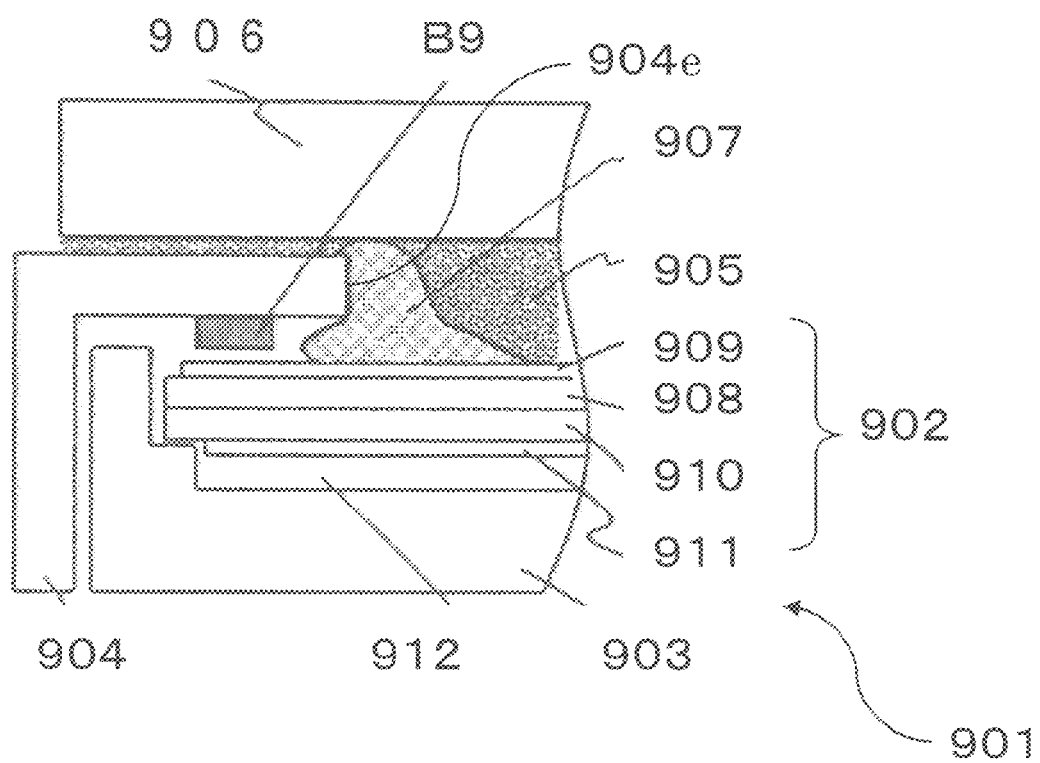
FIGS. 16A, 16B, and 16C are drawings showing the detailed cross section of the structure of the display module in Example 8 according to the present invention.
Figure 16B:
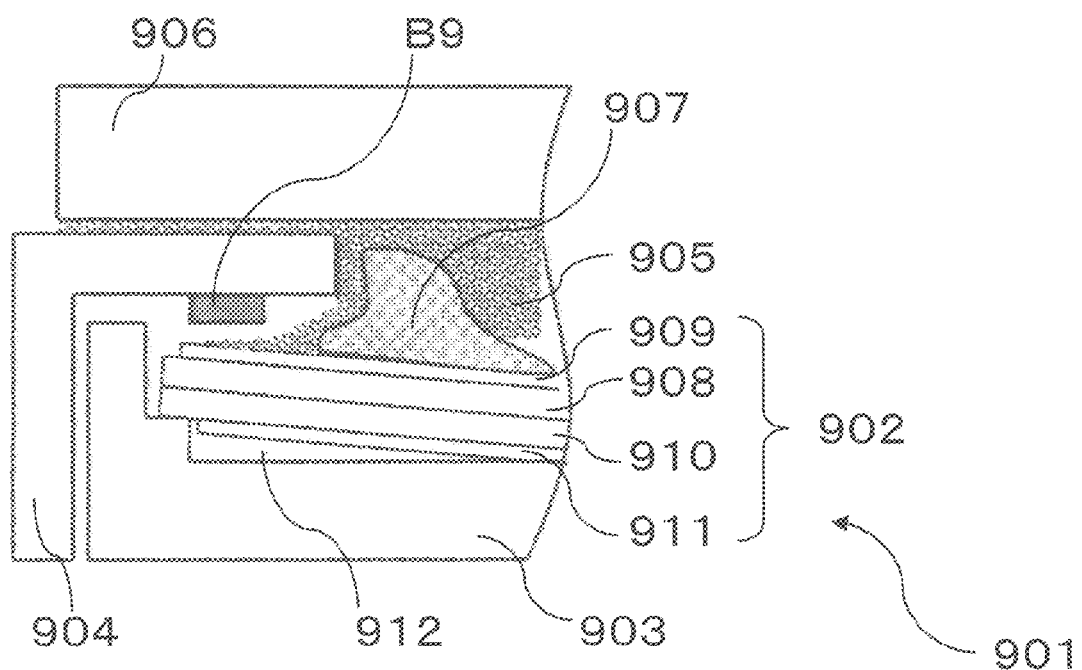
Figure 16C:
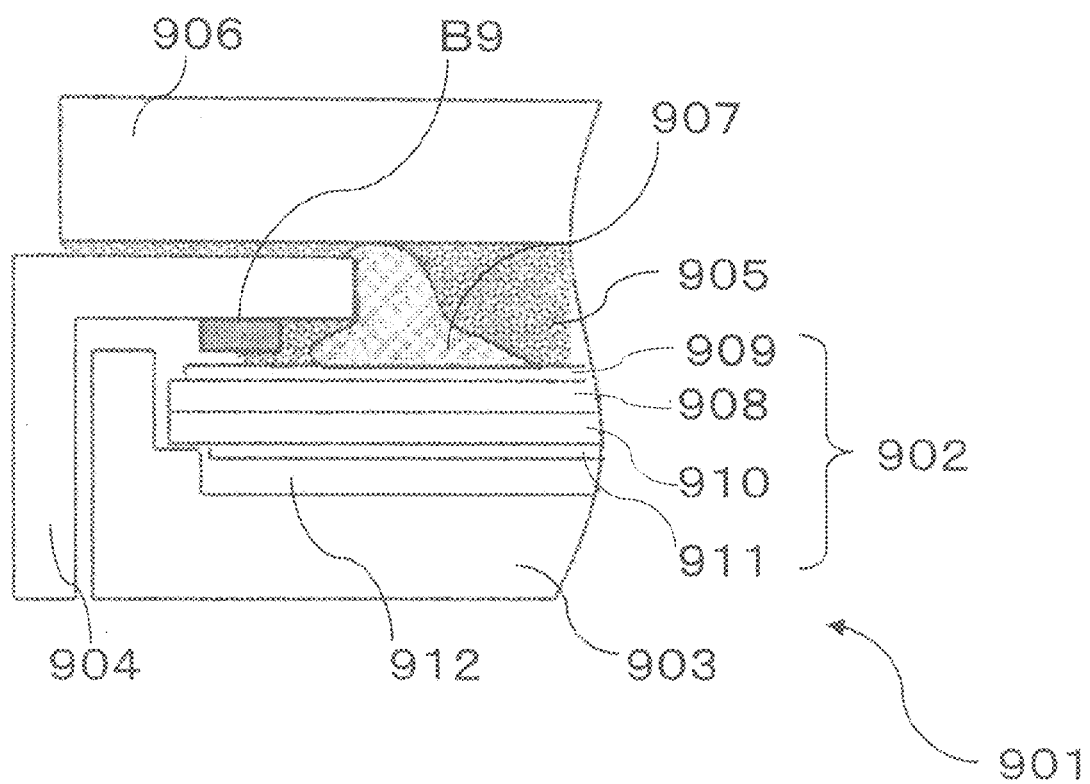

The above case is shown in FIGS. 16A, 16B and 16C as the eighth example. The structure of a display module 901 in the present example is the same as in Example 1. The supporting structure of a backlight unit 903 and an LCD panel 902 is shown more precisely in FIGS. 16A, and assumed is a structure in which an outer periphery part of the LCD panel 902 is supported by the backlight unit 903 and in which an aperture is present between a part other than the outer periphery part of the LCD panel 902 and the backlight unit 903. In the above display module 901, a resin dam 907 is formed along an open end 904e of the bezel in a process of optical bonding, and assumed is a structure in which the open end 904e of the bezel is brought into contact with the resin dam 907 over the whole periphery of the bezel. An OCR 905 is coated in order to wholly bond display surfaces in the display module 901, and the front panels are bonded. However, a pressing stress in bonding and an unnecessary stress in a transporting step of the above display module 901 are brought about, and the LCD panel 902 is bent, as shown in FIG. 16B, in a concave direction, whereby the open end 904e of the bezel and the resin dam are separated in a certain case. Then, a route through which the OCR 905 leaks out into an inside of the display module 901 is formed, and it leaks out into a space of the rear side of the bezel 904. In this case, the open end 904e of the bezel and the resin dam 907 are separated due to a temporary external force exerted on the LCD panel 902 and the bezel 904, and therefore it returns to the original state by removing the external force. That is, an infiltration rout of the OCR is merely formed temporarily in the middle of the step, and the structure of the resin dam 907 remains basically unchanged in a normal state before and after bonding, but it results in overflowing the dam (FIG. 16C). Also in the above case, the OCR 905 infiltrated by overflowing the dam is absorbed by a resin flow-inhibiting member B9 according to the present invention, and therefore it results in making it possible to inhibit the OCR 905 from being diffused into an inside of the module 901.

Example 9

Figure 17A:
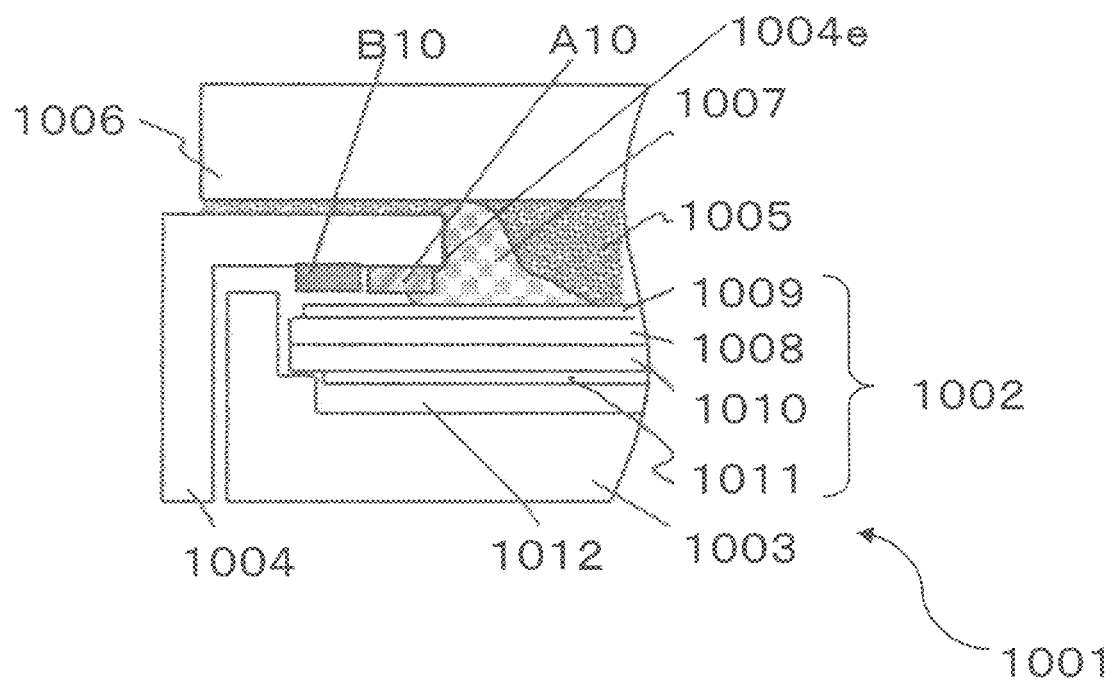
FIGS. 17A, 17B, and 17C are drawings showing the detailed cross section of the structure of the display module in Example 9 according to the present invention.
Figure 17B:
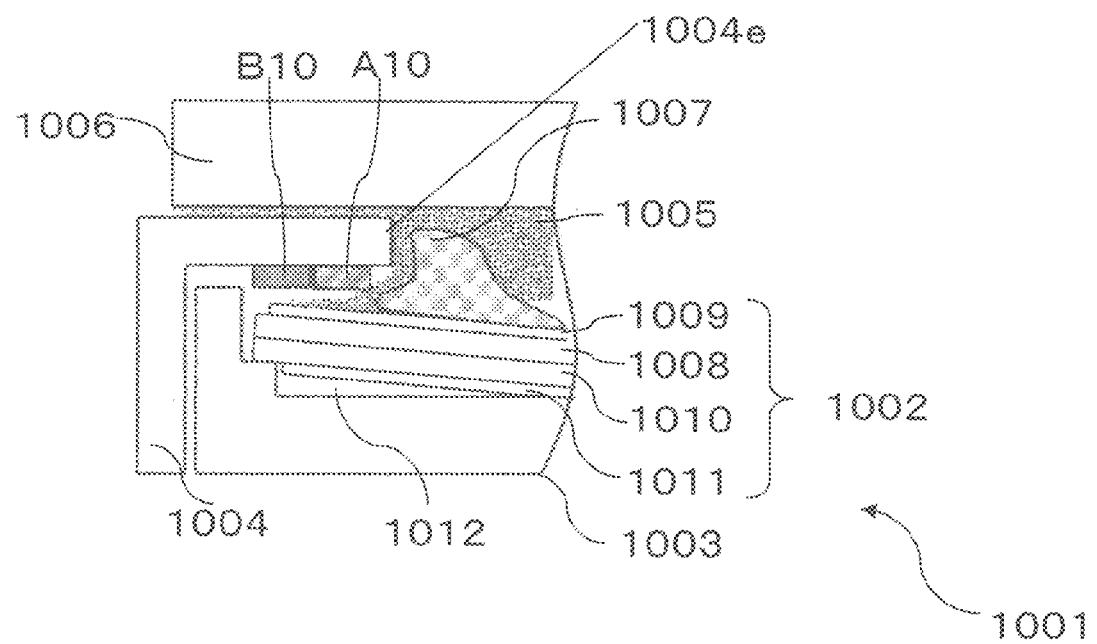
Figure 17C:
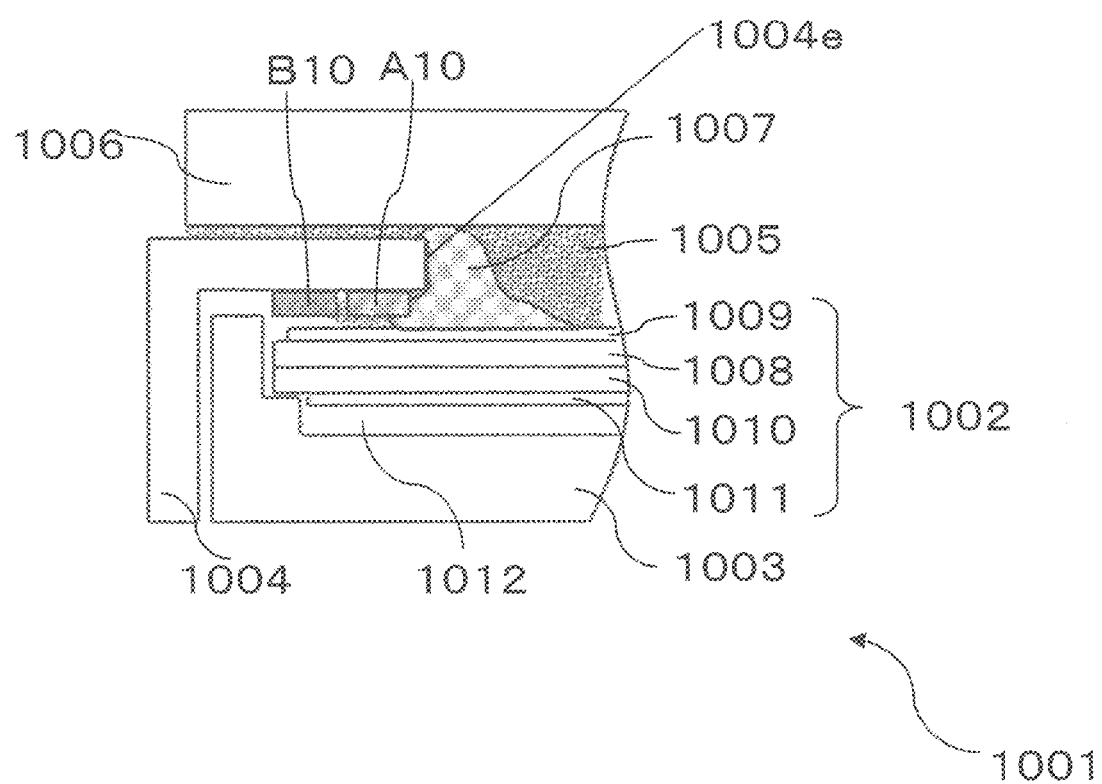

Further, Example 9 is shown in FIGS. 17A, 17B and 17C. The present example is a case in which the form of a resin dam 1007 is good in Example 7, and it shows a structure in which a bezel 1004 is brought into contact with the resin dam 1007. As shown in Example 8, if the dam is overflowed by temporary separation (FIG. 17B) of an open end 1004e of the bezel and a resin flow-inhibiting member A10 from the resin dam 1007, an OCR 1005 is absorbed by a resin flow-inhibiting member B10 which is arranged adjacent to the member A10, and therefore the same effect as in Example 7 is provided (FIG. 17C).

Example 10

Examples 10 to 13 are cases in which the forms of the resin dams are good in the structures of Examples 3 to 6 respectively, and the effects thereof are the same as in the respective corresponding examples.

In Example 6 and Example 13, the forms of the decoration print part and the resin flow-inhibiting member are different, but it is a difference for convenience sake and does not relate to the essence of the present application.

Figure 18:
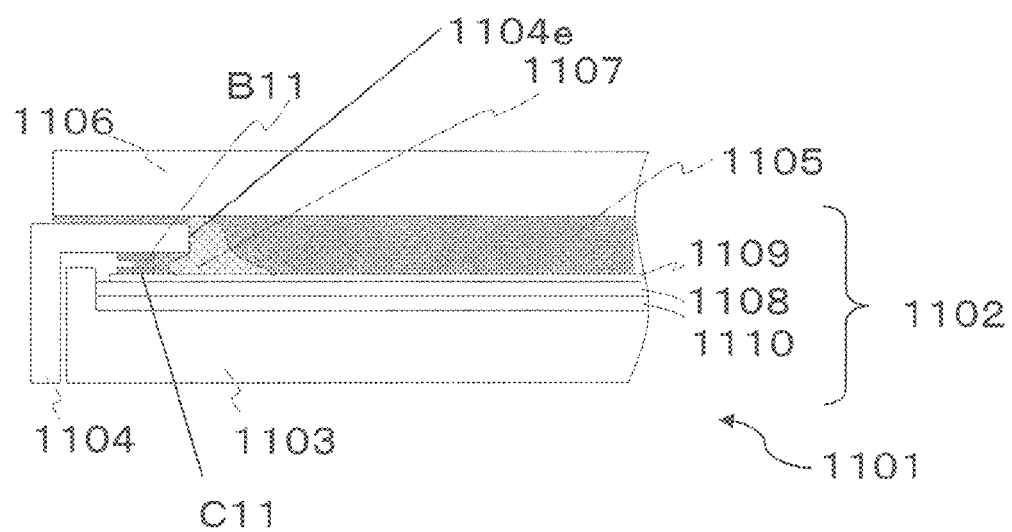
FIG. 18 is a drawing showing the detailed cross section of the structure of the display module in Example 10 according to the present invention.

In Example 10 of the present invention, a resin flow-inhibiting member B11 having an OCR absorbing property is arranged, as shown in FIG. 18, on a rear side of a bezel 1104, and a resin flow-inhibiting member C11 is arranged on a surface of an LCD panel 1102. An aperture is provided between the resin flow-inhibiting members B11 and C11. In the case of the present example, if the dam is overflowed by temporary separation of an open end 1104e of the bezel from a resin dam 1107, an OCR 1105 leaked can be prevented more surely and quickly from being diffused, because a larger contact area of the OCR leaked with the resin flow-inhibiting members B11 and C11 can be secured.

Example 11

Figure 19:
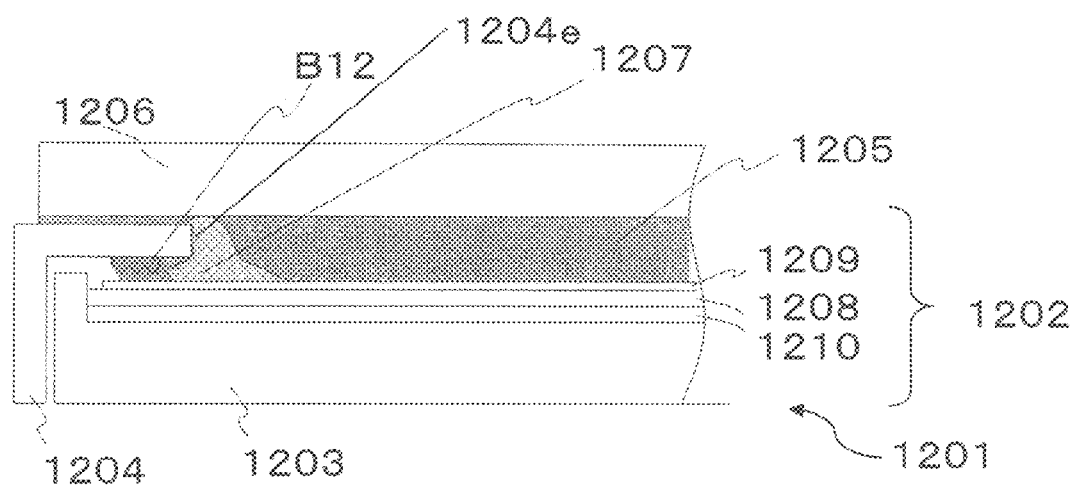
FIG. 19 is a drawing showing the detailed cross section of the structure of the display module in Example 11 according to the present invention.

Example 11 shall be explained with reference to FIG. 19. A resin flow-inhibiting member B12 is characterized in a form as compared with that in Example 1. It is different from the other examples in the point that irregularities are present on the resin flow-inhibiting member B12 at a surface side of a polarizing plate 1209. As shown in Example 10, if the dam is overflowed by temporary separation of an open end 1204e of the bezel from a resin dam 1207, an OCR 1205 can be prevented from leaking out, because a contact area thereof with the member B12 can be expanded by the irregularities present at a polarizing plate 1209 side, and therefore the same effect as in Example 10 is provided.

Example 12

Figure 20:
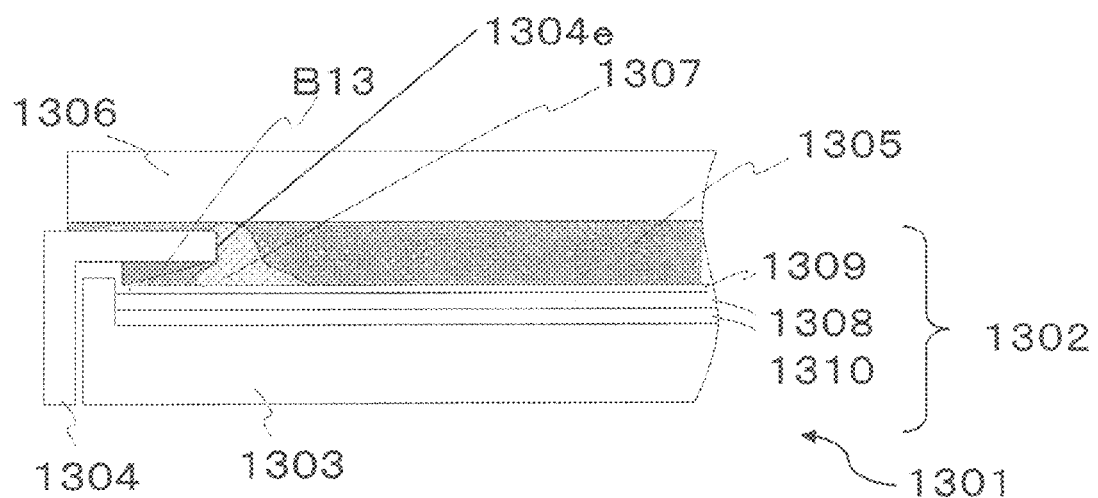
FIG. 20 is a drawing showing the detailed cross section of the structure of the display module in Example 12 according to the present invention.

Example 12 shall be explained with reference to FIG. 20. A resin flow-inhibiting member B13 is characterized in a form as compared with that in Example 1. It is different from the other examples in the point that a cross section of a resin flow-inhibiting member B13 is wedge-shaped and not rectangular as is the case with the other examples and that it has a form in which it is thick at a side opposite to an open end 1304e of a bezel and in which it is thin at an open end 1304e side. As shown in Example 10, if the dam is overflowed by temporary separation of an open end 1304e of the bezel from a resin dam 1307, an OCR 1305 can be prevented from leaking out, because a contact area thereof with the member B13 is expanded by the wedge present at a polarizing plate 1309 side, and therefore the same effect as in Example 11 is provided.

Example 13

Figure 21A:
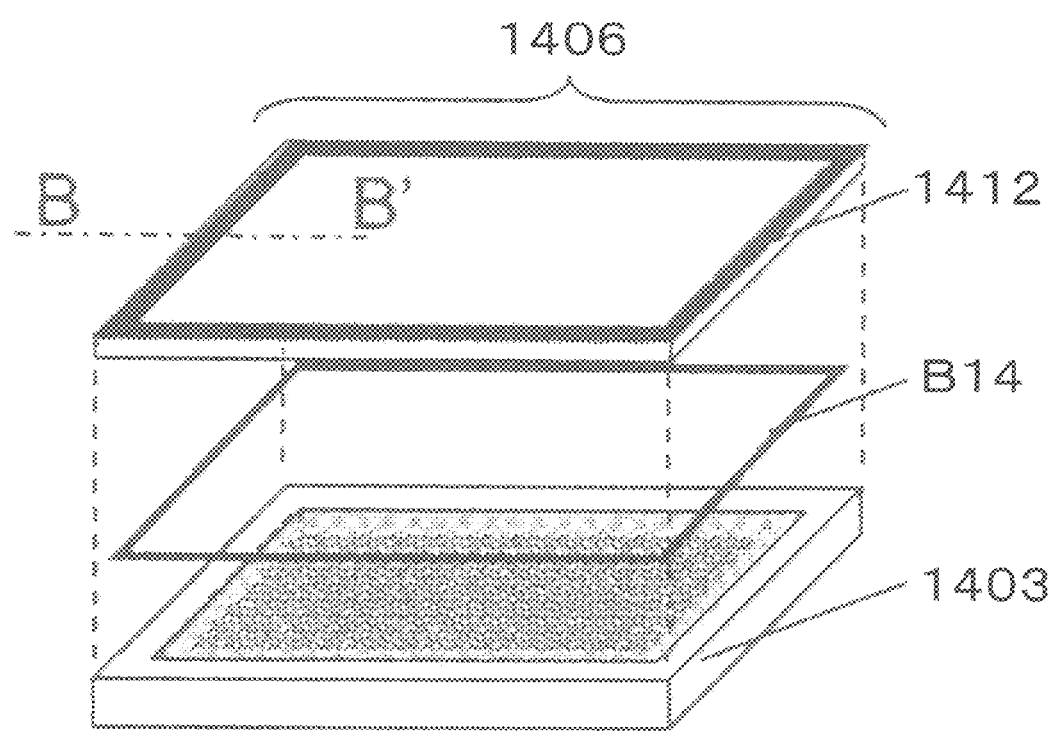
FIGS. 21A and 21B are drawings showing the detailed cross section of the structure of the display module in Example 13 according to the present invention.
Figure 21B:
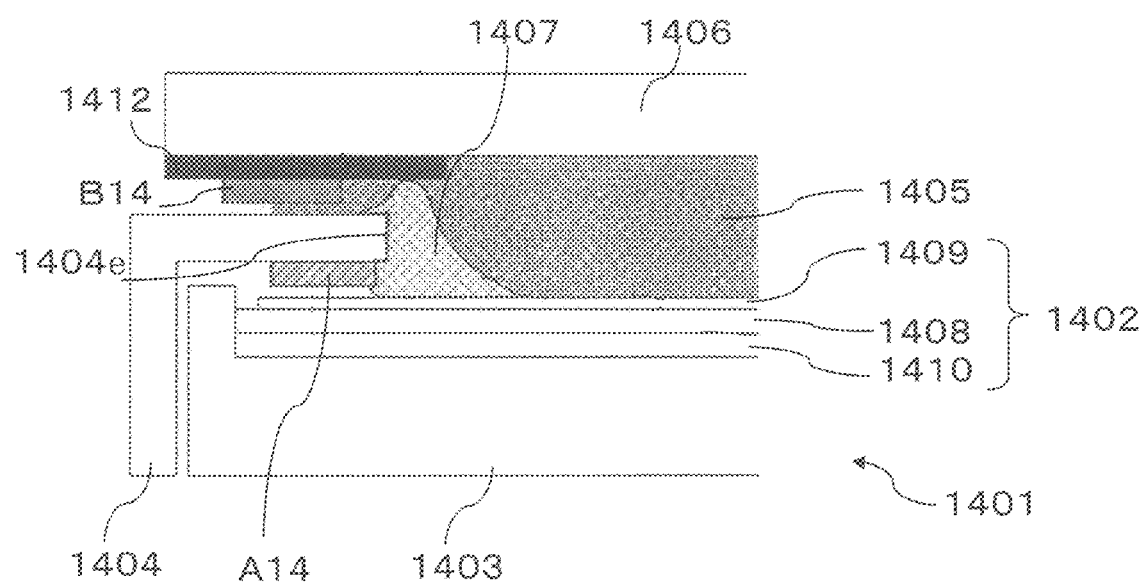

Example 13 shall be explained with reference to FIGS. 21A and 21B. It is different to a large extent in the point that a front plate is decorated as compared with Example 1. A decoration print part 1412 is provided over a whole periphery of an end part at a display module 1401 side of a decoration front plate 1406. The above decoration print part 1412 is provided up to a side insider than an open end 1404e of a bezel, and a resin dam 1407 is arranged so that a top part thereof is brought into contact with an inner periphery of the decoration print part 1412. Also, the decoration print part is provided so that a distance between the decoration front plate 1406 and the bezel is larger than a distance between the front panel 106 and the bezel in Example 1. Further, a resin flow-inhibiting member B14 is arranged on the decoration print part 1412. The above resin flow-inhibiting member B14 is constituted so that it prevents an OCR 1405 together with a resin flow-inhibiting member A14 provided on a lower surface of the open end 1404e of the bezel from leaking out from a space between the decoration front plate 1406 and the bezel 1404 and a space between the bezel 1404 and a polarizing plate 1409, if the resin dam 1407 is overflowed by temporary separation, and therefore the same effect as in Example 12 is provided.

DESCRIPTION OF SYMBOLS

101 to 1401: Display module
102 to 1402: LCD panel
103 to 1403: Backlight unit
104 to 1404: Bezel
105 to 1405: OCR (transparent optical elastomeric resin)
106 to 1306: Front panel
107 to 1407: Dam (resin dam)
108 to 1408: CF substrate (color filter substrate)
109 to 1409: Polarizing plate
110 to 1410: TFT substrate
104e, 204e, 504e, 904e, 1004e, 1104e, 1304e, 1404e: Open end of bezel
611: Decoration print part
1406 Decoration front plate
B1, B2, B9, B10, A10, B11, C11, B12, B13, B14, A14: Resin flow-inhibiting member having an OCR absorbing property
D: Display surface

What is claimed is:

1. A display device comprising a display module comprising upper and lower substrates bonded together, a case part for receiving the upper and lower substrates described above, and a bezel part which has an opened display part and which is mounted in the case part, and further comprising a front panel wholly bonded on a display part of the display module described above via a transparent optical elastomeric resin, and a resin dam disposed on a surface of the upper substrate along an open end of a reverse side of the bezel part, wherein at least a part of the resin dam is apart from the bezel part, and a resin flow-inhibiting member having a resin absorbing property which is disposed apart from the resin dam is provided in at least a part of a space part between the reverse side of the bezel part and the surface of the upper substrate.

2. A display device comprising a display module comprising upper and lower substrates bonded together, a case part for receiving the upper and lower substrates described above, and a bezel part which has an opened display part and which is mounted in the case part, and further comprising a front panel wholly bonded on a display part of the display module described above via a transparent optical elastomeric resin, and a resin dam disposed on a surface of the upper substrate along an open end of a reverse side of the bezel part, wherein at least a part of the resin dam is apart from the bezel part, and a resin flow-inhibiting member having no resin absorbing property which is disposed in contact with the resin dam is provided in at least a part of a space part between the reverse side of the bezel part and the surface of the upper substrate.

3. The display device according to claim 1, wherein the resin flow-inhibiting member described above is adhered and fixed to any one of the reverse side of the bezel part and the surface of the upper substrate and is not adhered and fixed to the other thereof, and an aperture is present between them.

4. The display device according to claim 2, wherein the resin flow-inhibiting member described above is adhered and fixed to any one of the reverse side of the bezel part and the surface of the upper substrate and is not adhered and fixed to the other thereof, and an aperture is present between them.

5. The display device according to claim 1, wherein the resin flow-inhibiting members are adhered and fixed independently to both of the reverse side of the bezel part and the surface of the upper substrate respectively, and an aperture is present between the opposite resin flow-inhibiting members.

6. The display device according to claim 2, wherein the resin flow-inhibiting members are adhered and fixed independently to both of the reverse side of the bezel part and the surface of the upper substrate respectively, and an aperture is present between the opposite resin flow-inhibiting members.

7. The display device according to claim 3, wherein the resin flow-inhibiting member has an approximately flat, waved or irregular form on a surface thereof which is opposite to the aperture.

8. The display device according to claim 4, wherein the resin flow-inhibiting member has an approximately flat, waved or irregular form on a surface thereof which is opposite to the aperture.

9. The display device according to claim 5, wherein the resin flow-inhibiting member has an approximately flat, waved or irregular form on a surface thereof which is opposite to the aperture.

10. The display device according to claim 6, wherein the resin flow-inhibiting member has an approximately flat, waved or irregular form on a surface thereof which is opposite to the aperture.

11. The display device according to claim 1, wherein the resin flow-inhibiting member has an approximately rectangular or wedge form on a cross section thereof which is orthogonal to a display face of the display part.

12. The display device according to claim 2, wherein the resin flow-inhibiting member has an approximately rectangular or wedge form on a cross section thereof which is orthogonal to a display face of the display part.

13. A display device comprising a display module comprising upper and lower substrates bonded together, a case part for receiving the upper and lower substrates described above, and a bezel part which has an opened display part and which is mounted in the case part, and further comprising a front panel wholly bonded on a display part of the display module described above via a transparent optical elastomeric resin, and a resin dam disposed on a surface of the upper substrate along an open end of a reverse side of the bezel part, wherein the resin dam is brought into contact with the bezel part; a resin flow-inhibiting member having a resin absorbing property which is disposed apart from the resin dam is provided in at least a part of a space part between the reverse side of the bezel part and the surface of the upper substrate; and the transparent optical elastomeric resin is present in at least a part of the space part between the reverse side of the bezel part and the surface of the upper substrate.

14. The display device according to claim 13, wherein a resin flow-inhibiting member which is disposed in contact with the resin dam and which does not have a resin absorbing property is further provided in at least a part of the space part between the reverse side of the bezel part and the surface of the upper substrate.

15. The display device according to claim 13, wherein the resin flow-inhibiting member described above is adhered and fixed to any one of the reverse side of the bezel part and the surface of the upper substrate and is not adhered and fixed to the other thereof, and an aperture is present between them.

16. The display device according to claim 13, wherein the resin flow-inhibiting members are adhered and fixed independently to both of the reverse side of the bezel part and the surface of the upper substrate respectively, and an aperture is present between the opposite resin flow-inhibiting members.

17. The display device according to claim 15, wherein the resin flow-inhibiting member has an approximately flat, waved or irregular form on a surface thereof which is opposite to the aperture.

18. The display device according to claim 16, wherein the resin flow-inhibiting member has an approximately flat, waved or irregular form on a surface thereof which is opposite to the aperture.

19. The display device according to claim 13, wherein the resin flow-inhibiting member has an approximately rectangular or wedge form on a cross section thereof which is orthogonal to a display face of the display part.

* * * * *